United States Patent [19]

Nitta

[11] Patent Number: 4,927,747
[45] Date of Patent: May 22, 1990

[54] NONCONTROLLING TYPE VALVE

[75] Inventor: Tomio Nitta, Yokohama, Japan

[73] Assignee: Tokai Corp., Yokohama, Japan

[21] Appl. No.: 342,201

[22] Filed: Apr. 24, 1989

[30] Foreign Application Priority Data

Apr. 27, 1988 [JP] Japan .................. 63-55865[U]

[51] Int. Cl.⁵ .................. F23D 14/28; F23Q 2/16
[52] U.S. Cl. .................. 431/344; 222/3; 137/549
[58] Field of Search .......... 137/544, 549, 550; 222/3; 431/344

[56] References Cited

U.S. PATENT DOCUMENTS

| | | | |
|---|---|---|---|
| 2,662,590 | 12/1953 | Reich | 431/344 |
| 3,409,049 | 11/1968 | Racek | 431/344 |
| 3,525,497 | 8/1970 | Zalar | 431/344 |
| 3,590,591 | 7/1971 | Genoud | 431/344 X |
| 3,663,152 | 5/1972 | Yoshida | 431/344 |
| 3,860,385 | 1/1975 | Nakanishi | 431/344 |
| 3,963,413 | 6/1976 | Lockwood et al. | 431/344 X |
| 4,072,290 | 2/1978 | Neyret | 431/344 X |
| 4,311,450 | 1/1982 | Camos | 222/3 X |
| 4,332,549 | 6/1982 | Fuller | 431/344 |
| 4,484,888 | 11/1984 | Grossiord et al. | 222/3 X |

FOREIGN PATENT DOCUMENTS

| | | | |
|---|---|---|---|
| 1457631 | 10/1969 | Fed. Rep. of Germany | 431/344 |
| 2389834 | 1/1979 | France | 431/344 |

Primary Examiner—John Rivell
Attorney, Agent, or Firm—Armstrong, Nikaido, Marmelstein, Kubovcik & Murray

[57] ABSTRACT

A noncontrolling type valve for use in a gaslighter, a portable cooking stove and other burners, which valve comprises a valve body push-fitted in a recess formed in the top plate of a gas container; and a filter positioned under the valve body to permit the gas to flow at a controlled rate. The valve according to the present invention uses a porous concave object as a filter. The filter is laid on an impermeable, resilient membrane. The gas invades the concave space of the porous object from the outside to flow in the valve opening. The rise of the surrounding temperature will cause the membrane to bend yieldingly upwards to cover the inside of the porous object, thereby preventing the increase of the gas flow passing through the porous object over a predetermined flow rate.

1 Claim, 1 Drawing Sheet

NONCONTROLLING TYPE VALVE

BACKGROUND OF THE INVENTION

1. Field of the Invention

The present invention relates to a noncontrolling type valve for use in a gaslighter, a portable cooking stove and other burners. Such a valve permits a given constant amount of gas to flow to the nozzle when the valve opens.

2. Related Art

A conventional noncontrolling type valve is built in a recess formed in the top plate of a gas container. The recess has a through aperture in its bottom to communicate with the inside of the gas container. A valve body is push-fitted in the recess, and a filter of porous film is positioned between the valve body and the through aperture of the recess bottom, not contacting the valve body and the recess bottom, permitting a given constant amount of gas to flow.

The porous filter is separate from the recess bottom and from the valve bottom. When the valve is opened, the porous filter will be exposed to gas pressure, and accordingly it will be yieldingly bent upwards. Thus, it is liable to be loosened or deformed with the result that the gas-passing area of the filter varies and that the gas flow rate varies accordingly. When the gas pressure in the gas container increases with the increase of surrounding temperature, the length of the nozzle flame will increase, and at the same time the flame will become unstable.

SUMMARY OF THE INVENTION

In view of the above one object of the present invention is to provide a noncontrolling type valve structure which is guaranteed free from the adverse effect caused by varying gas pressure to supply a controlled amount of gas for spouting a given constant height of stable flame.

Another object of the present invention is to provide a noncontrolling type valve structure which permits easy assembling of parts.

To attain these objects a noncontrolling type valve which comprises a recess formed in the top plate of a gas container, said recess having a through aperture in its bottom to communicate with the inside of said gas container; a valve body push-fitted in said recess; and a filter positioned under said valve body to permit a given constant flow of gas to pass to said valve body when said valve opens, is improved according to the present invention in that said filter is a porous object having a center aperture and a downward-divering space, said porous object being laid on the bottom end of said value body with its center aperture in alignment with the valve opening of said valve body, and that said valve further comprises: a slotted ring push-fitted in said recess and laid across said through aperture of the bottom of said recess; an impermeable, resilient membrane applied to said slotted ring, said porous object being laid on said membrane; and an O-ring fitted around the bottom end of said valve body and pushed against the inside edge of the uppersurface of said porous object and against the inner wall of said recess to prevent the gas from leaking sideways.

With this arrangement the liquefied petroleum gas changes from the liquid to gaseous phase on the surface of the gas well, and the gas passes through the aperture in the recess bottom and then through the slots of the ring. Then, the closed space bounded by the O-ring, the inner wall of the recess and the outer wall of the porous object is filled with the gas. The gas passes through the porous wall to invade in the downward-diverging space of the porous object. Then, the gas flows in the valve opening of the valve body. The gas passes through the gap between the raised valve stem and the stationary valve trunk to flow in the channel of the valve stem, and finally the gas flows out in the atmosphere.

The gas pressure increases with the increase of surrounding temperature, and then the impermeable, resilient membrane will be exposed to such an increased gas pressure until the membrane is yieldingly bent upwards to cover the inner surface of the downward-divergent wall, thereby closing the pores on the wall to keep the gas flow at a predetermined rate.

Other objects and advantages of the present invention will be understood from the following description of a noncontrolling type valve according to a preferred embodiment of the present invention, which is shown in accompanying drawings:

PREFERRED EMBODIMENT OF THE INVENTION

Figure 1:
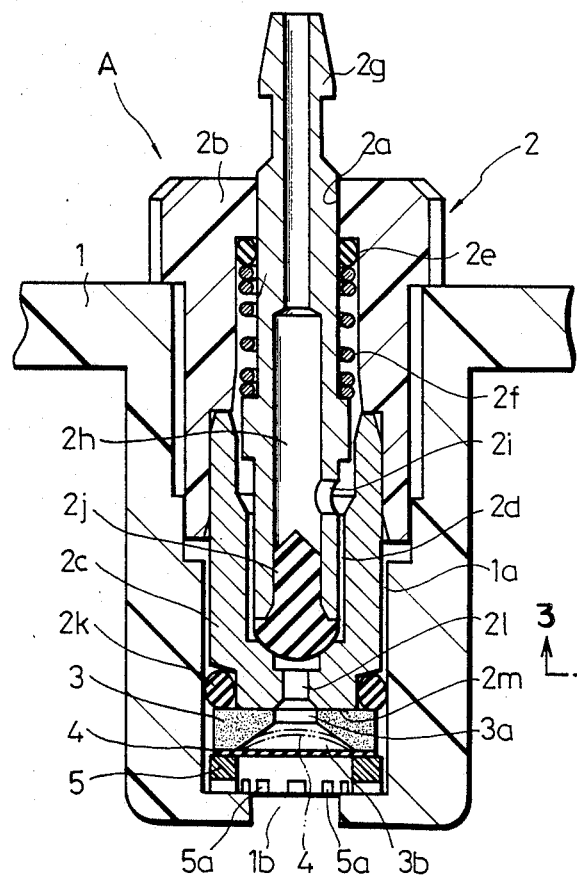
FIG. 1 is a longitudinal section of a noncontrolling type valve according to a preferred embodiment of the present invention.
Figure 2:
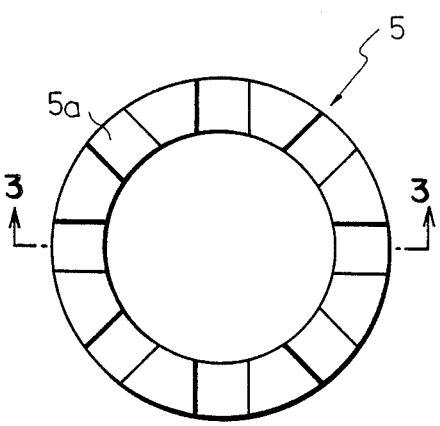
FIG. 2 is a plane view of a slotted ring.
Figure 3:
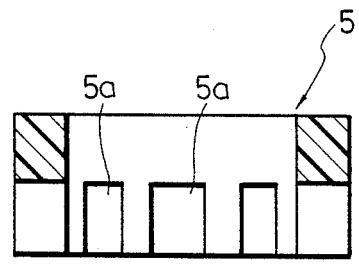
FIG. 3 is a sectional view of the slotted ring taken along the line III—III in FIG. 2.

FIG. 1 shows a noncontrolling type valve A for use in a gaslighter, a portable cooking stove and other burners as being built in the top plate 1 of a gas container (not shown). Specifically, the top plate 1 is integrally connected by ultrasonic welding to the gas container casing to hermetically close its top. Liquefied petroleum gas is put in the gas container.

As shown, a recess 1a is formed in the top plate 1 of the gas container. The recess 1a has a through aperture 1b in its bottom to communicate with the inside of the gas container (not shown).

The valve 2 is push-fitted in the recess 1a. The valve 2 comprises a cylindrical screw cap 2b having an opening 2a on its top and threads on its outside, and a cylindrical trunk 2c fitted in the bottom of the cylindrical screw cap 2b. The cylindrical screw cap 2b and the cylindrical trunk 2c define a valve compartment 2d. A nozzle 2g is put in the compartment 2d with its tip and 2g projecting from the cylindrical screw cap 2b. The nozzle 2g is biased downward by a spring 2f. An O-ring 2e is pushed against the ceiling of the valve compartment 2d to hermetically close the gap between the nozzle 2g and the cylindrical screw cap 2b. The nozzle 2g has a longitudinal channel 2h and a lateral channel 2i. The nozzle 2g has a rubber plug 2j at its bottom to close its longitudinal channel 2h. When the nozzle 2g is pulled up, the rubber plug 2j rises to open the valve opening 2l. An O-ring 2k is fitted in the circumferential slot of the lower end of the cylindrical trunk 2c. The O-ring 2k is pushed against the inside edge of a porous object 3, which is later described.

As seen from FIG. 1, a slotted ring 5 of a synthetic resin such as a plastic material is push-fitted in the recess until it is laid across the through aperture 1b of the recess bottom. The ring 5 has a plurality of slots 5a made in its circumferential side. An impermeable, resilient membrane 4 and an annular porous object 3 are laid on the slotted ring 5 in the order named. The porous object 3 has a center aperture 3a in its ceiling and a downward-diverging conical space 3b.

As seen from FIG. 1, the bottom end 2m of the trunk 2c of the valve is pushed against the uppersurface of the annular porous object 3. An O-ring 2k is fitted around the bottom end of the trunk 2c of the valve body, and is pushed against the inside edge of the uppersurface of the porous object 3 and against the inner wall of the recess to prevent the gas from leaking sideways.

A lever (not shown) is swingably supported with its end fixed to the neck of the nozzle 2g, which appears above the valve cap 2b. When the lever is operated to pull up the nozzle 2g, the rubber plug 2j rises apart from the plug seat to open the valve opening 21. Then, the ejection of gas starts.

The liquid petroleum gas changes from the liquid to gaseous phase on the surface of gas well. When the valve opens, the gas passes through the slots 5a of the slotted ring 5 to fill the closed space which is bounded by the inner wall of the recess, the O-ring 2k and the outer wall of the porous object 3. Then, the gas invades in the conical space 3b from the outer wall of the porous object 3. Thus, a controlled amount of gas passes through the center aperture 3a of the ceiling of the porous object 3 to flow in the valve opening 21. Then, the gas passes through the gap between the raised rubber plug 2j and the plug seat of the trunk 2c of the valve body to enter the valve compartment 2d. Finally, the gas flows in the lateral and longitudinal channels 2i and 2h of the valve stem 2a to flow out in the atmosphere.

When the gas pressure increases with the increase of surrounding temperature, and when the impermeable resilient membrane 4 is exposed to an increased pressure, it will be bent upwards to cover the inner wall of the porous object 3, thereby preventing the increase of the gas flow over the predetermined flow rate, and stabilizing the flame spout from the nozzle.

I claim:

1. A noncontrolling type valve for a gas container having a top plate, a recess formed in said top plate, said recess having a through aperture in its bottom communicating with the inside of said gas container comprising; a valve body having a valve opening at one end push-fitted in said recess with said valve opening facing said through opening in said bottom of said recess; and a filter positioned in said recess under said valve body for permitting a given constant flow of gas to pass to said valve body when said valve opens, characterized in that said filter is a porous object having a center aperture and a downward-diverging space, said porous object being in said recess between a bottom end of said valve body and said bottom of said recess with said center aperture in alignment with said valve opening of said valve body, said valve further comprises; a slotted ring push-fitted in said recess in advance of said valve body and said porous object and across said through aperture in said bottom of said recess; an impermeable, resilient membrane on said slotted ring, said porous object engaging said membrane; and an O-ring fitted around said one end of said valve body and pushing against an inside edge of an uppersurface of said porous object and against an inner wall of said recess for preventing gas from leaking sideways past said O-ring.

* * * * *